Figure 1:
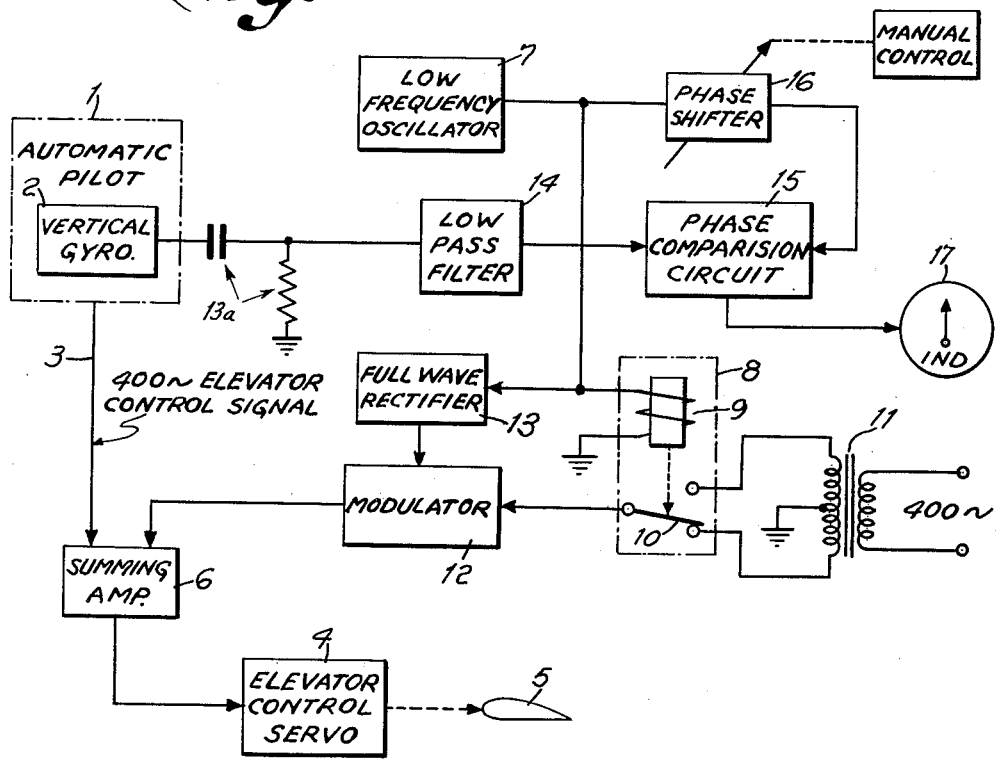

July 17, 1962

R. J. HEPPE 3,044,734

CONTROL REVERSAL SENSOR

Filed Nov. 10, 1958

INVENTOR.
ROBERT J. HEPPE
BY Robert T Dunn
AGENT

United States Patent Office 3,044,734
Patented July 17, 1962

3,044,734
CONTROL REVERSAL SENSOR
Robert J. Heppe, North Caldwell, N.J., assignor to International Telephone and Telegraph Corporation, Nutley, N.J., a corporation of Maryland
Filed Nov. 10, 1958, Ser. No. 773,099
4 Claims. (Cl. 244—77)

This invention relates to systems for sensing the reversal of the effect of a given control action on a controlled device and more particularly to a system for detecting such a reversal in the control of an aircraft in flight.

High speed aircraft and missiles moving at transonic speeds have exhibited a phenomenon often referred to as "control reversal." As a consequence of this "control reversal" the direction of control surface motion to achieve a given maneuver, such as for example, pitch or roll, reverses and is the opposite of the direction of control surface motion required to achieve a similar maneuver at a different or lower speed. This sense reversal poses problems for the pilot and the autopilot designers since many autopilot systems cannot determine when this "control reversal" occurs and, thus, cannot determine when to change the sense of a control action to accomplish a given maneuver. In the past, pilots of such aircraft have been able to solve the problem only by remaining watchful and alert to note its occurrence by the observance of gyroscopes and other indicating devices for indicating the attitude of the aircraft.

It is an object of this invention to provide means in an aircraft for detecting "control reversal" and to indicate its occurrence.

It is another object to provide a system for detecting a change in the operating sense of a controlled device in response to a given control action and to indicate said change.

It is a feature of this invention to apply a small oscillating signal to the motor means for driving an aircraft control surface and to detect the resulting rotational motion of the aircraft caused by said signal, then compare the phase of the signal with the phase of the aircraft motion with proper phase allowance being made for the aircraft inertia or lag, to yield a signal indicative of "control reversal."

It is another feature of this invention to apply an oscillating signal of small amplitude to the motor control means driving a control surface of an aircraft by modulating the frequency source of power for energizing said motor with said oscillating signal in such a manner that during negative excursion of said oscillating signal, the phase of said power is reversed 180°.

It is another feature to phase shift said oscillating signal by a controlled amount equivalent to the lag in the response of the aircraft in a given rotational mode and to phase compare this shifted oscillating signal with the output from a rotational sensor in the aircraft such as, for example, a gyroscope responsive to rotations of said aircraft in said given mode.

Figure 2:
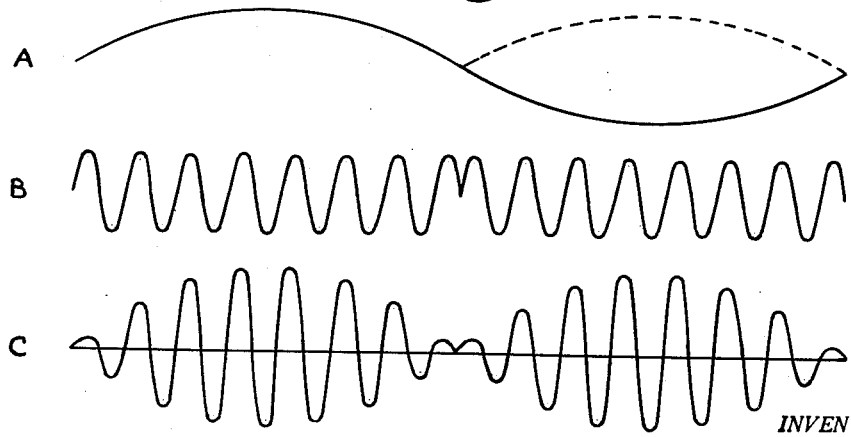

The foregoing and other objects and features of this invention and the manner of attaining them will become more apparent and the invention itself will be best understood by reference to the following description of an embodiment of the invention taken in conjunction with the accompanying drawings comprising FIGS. 1 and 2, wherein:

FIG. 1 depicts a block diagram and schematic of a control reversal sensing system for use in conjunction with an autopilot to detect control reversal in the pitch mode of an aircraft; and FIG. 2 is a waveform diagram by which to aid in understanding the operation of the system in FIG. 1.

Turning first to FIG. 1, there is shown an autopilot 1 including a pitch gyro 2, said autopilot producing a 400 cycle signal in line 3 for energizing an elevator control servo 4 which drives an aircraft elevator control surface 5. A summing amplifier 6 is provided coupling line 3 to control servo 4 for adding a low amplitude oscillating 400 cycle signal to the 400 cycle elevator control signal in line 3, thereby causing a small oscillating motion to be imparted to elevator control surface 5.

This small oscillating control signal added to the signal in line 3 originates in low frequency oscillator 7 whose output frequency is preferably a fraction of a cycle per second or at a frequency to which the aircraft can readily respond in an aerodynamic manner. The output of oscillator 7 is applied to polarized relay switch 8 which may, for example, consist of a polarized solenoid 9 which is energized only by positive excursions of the signal from oscillator 7. Solenoid 9 actuates switch 10 of relay 8 applying a 400 cycle signal from transformer 11 of zero degree phase or one hundred eighty degree phase to modulator 12, depending upon the position of switch 10. The output of oscillator 7 is also applied to modulator 12 via full wave rectifier 13. The output of rectifier 13 serves to modulate the 400 cycle signal fed to modulator 12 from transformer 11. This modulated 400 cycle signal is then fed to summing amplifier 6 where it is added to the 400 cycle elevator control signal in line 3 from the autopilot.

The action of polarized relay 8 is to apply a zero degree phase 400 cycle signal from transformer 11 to modulator 12 during positive excursions of the signal from oscillator 7, and to apply one hundred eighty degree phase 400 cycle signal from transformer 11 to modulator 12 during negative excursions of the signal from oscillator 7. Consequently, a low frequency signal from oscillator 7, such as shown by the solid line in waveform A of FIG. 2, will be rectified by rectifier 13 and this rectified signal will modulate the 400 cycle signal fed to modulator 12, such as shown in waveform B of FIG. 2. The action of modulator 12 will be to modulate a 400 cycle signal such as shown in waveform B by a low frequency full wave rectified signal such as shown by the upper solid and dashed lines representing positive excursions of the waveform A of FIG. 2 and the output of modulator 12 will be as shown by waveform C of FIG. 2. The output of modulator 12 is combined with the elevator control signal from line 3 in summing amplifier 6. The purpose of the peculiar waveform of the output of modulator 12 (waveform C, FIG. 2) is to superimpose a low frequency oscillating control signal on top of whatever elevator control signal is being sent from the autopilot. The elevator control signal has two phases for controlling the elevator control servo 4, one for each direction. It will be seen that the first half of waveform C has one phase, which is for example, in phase with one phase of the elevator control signal and thereby adds to it, and the second part of the waveform C is 180 degrees out of phase with said one phase of the elevator control signal and subtracts from it. Thus, these two portions of waveform C impart the oscillating motion to elevator 5 on top of whatever other control is imparted thereto by elevator control signal 3. The output of pitch gyro 2 is differentiated by circuit 13a and applied to low pass filter 14 which is tuned to the frequency of oscillator 7. Consequently, the output of filter 14 represents the angular velocity of the aircraft in response to the small oscillating motion imparted to surface 5. This output from filter 14 is then phase compared with the phase shifted output of oscillator 7 by phase comparing circuit 15, the phase shifting being accomplished by manually controlled phase shift network 16. The output of circuit 15 might be applied to indicator 17 for indicating control reversal. There is a definite range in degrees of lag or lead for each type of aircraft when the controls are normally operating due to the inertia of the aircraft and its aerodynamic response. The phase shifter 16 is normally set for that range according to the aircraft in which it is installed. The indicator 17 after comparison of the phase shifted signal output of phase shifter 16 and the output of the low pass filter 14 should indicate, in normal operation, substantially zero with some ± tolerance. If the indication is beyond this zero ± tolerance, then it will show that the controls are reversed. The automatic pilot can be adjusted to reverse the control signal in such cases and the pilot is alerted to the condition of control reversal and can take correcting action. The surface movement of the control 5 is substantially in phase with the output of oscillator 7 because the servo 4 is controlled by the output of oscillator 7 and in turn controls the surface movement of control 5.

While there is described above a specific embodiment of this invention, it is to be clearly understood that this is made only by way of example. Obviously, other means could be employed for applying a small low frequency signal to an aircraft control surface and other means could be employed for detecting the response of the craft to that signal and for phase comparing a signal representative of the craft's response with the small low frequency signal to indicate the occurrence of "control reversal." Consequently, the spirit and scope of this invention are set forth in the accompanying claims.

I claim:

1. A control reversal sensing system for a vehicle having means for driving a control element of said vehicle including an energizing signal for energizing said driving means, comprising an oscillating signal generator, means for modulating the output of said oscillating signal generator on a signal having a frequency equal to the frequency of said energizing signal, means for adding the output of said modulating means to said energizing signal, means for coupling the output of said adding means to said driving means so that the force producing output of said driving means produces oscillations in the motion of said vehicle during the application of said energizing signal to said driving means, means to detect said oscillations in said vehicle and means for comparing the output of said detecting means with the output of said oscillating signal generator to detect any reversal in the motion of said control element.

2. A control reversal sensing system for a vehicle having means for driving a control element of said vehicle including an energizing signal for energizing said driving means comprising an oscillator, a source of another signal having a frequency equal to the frequency of said energizing signal, means for modulating said other signal with the output of said oscillator, means for combining said energizing signal with said modulated signals, means for coupling said combined signals to said driving means so that the output of said energizing means produces oscillations in the motion of said vehicle during the application of said energizing signal to said energizing means, means to detect said oscillations in said vehicle and means for comparing the output of said detecting means with the output of said oscillator to detect any reversal in the motion of said control element.

3. A control reversal sensing system for an aircraft having means for driving an elevator control surface of said aircraft including a signal for energizing said driving means, comprising a low frequency oscillator, a source producing another signal having a frequency equal to the frequency of said energy signal, means to modulate said other signal with the output of said low frequency oscillator, means to add said modulated signal and said energizing signal, means to couple said added signals to said driving means so that the output of said driving means produces low frequency oscillations in the motion of said aircraft during the application of said energizing signal to said driving means, means to detect said low frequency oscillations in said aircraft and means for comparing the outputs of said detecting means and said low frequency oscillator to produce a signal indicative of any reversal in the motion of said elevator control surface.

4. A control reversal sensing system for an aircraft having means for driving an elevator control surface of an aircraft including a signal for energizing said driving means comprising a low frequency oscillator, a power signal having a frequency equal to the frequency of said energizing signal, means for modulating said power signal with the output of said low frequency oscillator, means to add said modulated signal and said energizing signal, means to couple said added signals to said driving means so that the output of said driving means produces low frequency oscillations in the motion of said aircraft during the application of said energizing signal to said driving means, a gyroscopic device for sensing rotations of said aircraft, filter means coupled to the output of said gyroscopic device for passing only low frequency signals representing the action of said aircraft caused by the response of said elevator control surface to said modulated signals, phase comparing means coupled to the output of said filter means, phase shifting means coupling the output of said low frequency oscillator to said phase comparing means, said phase shift being adjusted to compensate for the lag in the motion of said aircraft in response to the output of said driving means and indicating means coupled to the output of said phase comparing means for indicating a reversal in the effect of said driving means on the motion of said aircraft.

References Cited in the file of this patent

UNITED STATES PATENTS

| | | |
|---|---|---|
| 1,559,642 | Nyquist | Nov. 3, 1925 |
| 1,645,618 | Nyquist | Oct. 18, 1927 |
| 2,241,615 | Plebanski | May 13, 1941 |
| 2,543,077 | Treseder | Feb. 27, 1951 |
| 2,747,141 | Hine | May 22, 1956 |
| 2,773,252 | Noxon | Dec. 4, 1956 |

OTHER REFERENCES

"Modern Servo Mechanism Testers," article in Electrical Engineering, September 1950, pages 814–816.